United States Patent
Lee et al.

(10) Patent No.: US 11,697,380 B2
(45) Date of Patent: Jul. 11, 2023

(54) SYSTEM AND METHOD FOR DISPLAYING VEHICLE DRIVING INFORMATION

(71) Applicant: HYUNDAI MOBIS Co., Ltd., Seoul (KR)

(72) Inventors: Woo Sung Lee, Yongin-si (KR); Geon Pyo Kim, Yongin-si (KR); Hyun Ho Park, Yongin-si (KR); Kwang Ho Jung, Yongin-si (KR); Yong Jun Seo, Yongin-si (KR); Ki Hun Bang, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 307 days.

(21) Appl. No.: 16/921,510

(22) Filed: Jul. 6, 2020

(65) Prior Publication Data
US 2021/0001783 A1     Jan. 7, 2021

(30) Foreign Application Priority Data

Jul. 5, 2019    (KR) .......................... 10-2019-0081203

(51) Int. Cl.
*B60R 11/04*    (2006.01)
*B60R 11/00*    (2006.01)

(52) U.S. Cl.
CPC ......... *B60R 11/04* (2013.01); *B60R 2011/004* (2013.01); *B60R 2300/105* (2013.01);
(Continued)

(58) Field of Classification Search
CPC ............... B60R 2300/202; B60R 11/04; B60R 2300/301; B60R 2300/802; B60R 2300/8046; B60R 2300/8066
See application file for complete search history.

(56) References Cited

U.S. PATENT DOCUMENTS 6,559,761 B1 *  5/2003  Miller ...................... B60R 1/00
                                                         367/909
10,442,295 B2 * 10/2019  Kim ........................ G02B 27/01
(Continued)

FOREIGN PATENT DOCUMENTS

DE    102018104012 A1 *  8/2018  ............. B60Q 9/008
DE    102018004573 A1 * 11/2018
(Continued)

OTHER PUBLICATIONS

J. Deigmoeller, H. Janssen, O. Fuchs and J. Eggert, "Monocular rear approach indicator for motorcycles," 2014 International Conference on Computer Vision Theory and Applications (VISAPP), 2014, pp. 474-480. (Year: 2014).*
(Continued)

*Primary Examiner* — Christopher K Peterson
(74) *Attorney, Agent, or Firm* — H.C. Park & Associates, PLC (57) ABSTRACT

A system for displaying vehicle driving information may include: first and second image acquisition devices configured to capture an image of a first side on which a driver seat is located and an image of a second side which is the opposite side of the first side, respectively; first and second display devices configured to display the captured images of the first and second image acquisition devices, respectively; first and second BSD devices and configured to sense side-rear vehicle information; and a control device configured to recognize the location and vehicle distance of the side-rear vehicle by analyzing the side-rear vehicle information detected by the first and second BSD devices, determine whether to issue a BSD warning, and control BSD warning icons of the ego vehicle and the side-rear vehicle to be displayed as an OSD of the images displayed on the first and second display devices.

14 Claims, 9 Drawing Sheets

(52) U.S. Cl.
CPC ... *B60R 2300/202* (2013.01); *B60R 2300/301* (2013.01); *B60R 2300/70* (2013.01); *B60R 2300/802* (2013.01); *B60R 2300/8026* (2013.01); *B60R 2300/8093* (2013.01)

(56) References Cited

U.S. PATENT DOCUMENTS

| | | | | |
|---|---|---|---|---|
| 11,034,299 | B2* | 6/2021 | Peterson | G06V 20/58 |
| 2003/0076415 | A1* | 4/2003 | Strumolo | B60R 1/00 |
| | | | | 348/E7.087 |
| 2006/0290482 | A1* | 12/2006 | Matsumoto | G08G 1/167 |
| | | | | 340/436 |
| 2007/0126564 | A1* | 6/2007 | Lee | B60Q 9/005 |
| | | | | 340/435 |
| 2012/0062743 | A1* | 3/2012 | Lynam | G06V 20/58 |
| | | | | 348/148 |
| 2017/0253181 | A1* | 9/2017 | Choi | G06T 11/00 |
| 2017/0330463 | A1* | 11/2017 | Li | G08G 1/015 |
| 2019/0291642 | A1* | 9/2019 | Chae | G06T 7/30 |
| 2021/0024000 | A1* | 1/2021 | Peterson | G08G 1/167 |

FOREIGN PATENT DOCUMENTS

| | | | | |
|---|---|---|---|---|
| DE | 112018007432 | T5 * | 2/2021 | ...... B60W 30/18163 |
| JP | 2019185357 | A * | 10/2019 | |
| KR | 20070004300 | A * | 1/2007 | |
| KR | 20080092740 | A * | 10/2008 | |
| KR | 20120077309 | A * | 7/2012 | |
| KR | 10-2015-0005219 | | 1/2015 | |
| KR | 101849326 | B1 * | 4/2018 | |

OTHER PUBLICATIONS

B. Chakraborty and S. Mukherjee, "Rear-View Scene Analysis Using Monocular Camera for ADAS Applications," 2018 3rd International Conference for Convergence in Technology (I2CT), 2018, pp. 1-6, doi: 10.1109/I2CT.2018.8529512. (Year: 2018).*

* cited by examiner

SYSTEM AND METHOD FOR DISPLAYING VEHICLE DRIVING INFORMATION

CROSS-REFERENCE TO RELATED APPLICATION

This application claims priority from and the benefit of Korean Patent Application No. 10-2019-0081203, filed on Jul. 5, 2019, which is hereby incorporated by reference for all purposes as if set forth herein

BACKGROUND

Field

Exemplary embodiments relate to a system and method for displaying vehicle driving information, and more particularly, to a system and method for displaying vehicle driving information, which can make a driver intuitively recognize the distance between an ego vehicle and a side-rear vehicle.

DISCUSSION OF THE BACKGROUND

Recently, vehicles in which the ADAS (Advanced Driver Assistance System) are mounted to improve safe driving and driving convenience have been launched on the market.

The ADAS refers to an active safety device which prevents a traffic accident, and a vehicle having the ADAS function mounted therein is referred to as a smart car. Representative examples of the ADAS include AEB (Autonomous Emergency Braking), LDWS (Lane Departure Warning System), LKAS (Lane Keeping Assist System), BSD (Blind Spot Detection), CMS (Camera Monitor System) and the like. The AEB functions to measure a relative distance from a forward vehicle through a camera and a radar and automatically put on the brakes when it is determined that the vehicle is likely to collide.

Among them, the CMS is an ADAS function to replace a side mirror, and referred to as 'electronic mirror'.

The CMS is a device which has a high-performance camera mounted instead of a side mirror and displays an image captured through the camera on an indoor monitor. The CMS illustrates the side and rear of the vehicle to a driver.

Because the vehicle having the CMS mounted thereon has a viewing angle of 30 to 80°, the field of view of the CMS is wider than that of a general side mirror having a viewing angle of 15°, which makes it possible to reduce a side collision accident. Furthermore, because the camera of the CMS requires a smaller external attachment area than the existing side mirror protruding from the vehicle, air resistance may be decreased to reduce the fuel efficiency by 5 to 10%. Furthermore, the CMS can improve visibility in the nighttime or bad weather.

However, because the CMS displays a rear image through a monitor, it is more difficult for a driver to feel a sense of distance as compared to a general mirror. In this case, the driver may have difficulties in recognizing the distance from a vehicle approaching from the side rear, during a lane change.

Therefore, there is a demand for the development of a technology which can make a driver intuitively recognize the distance between an ego vehicle and a side-rear vehicle through the monitor of the CMS system.

The related art of the inventive concepts is disclosed in Korean Patent Application No. 2015-0005219 published on Jan. 14, 2015 and entitled "Method for Displaying Driving Information of Vehicles and Apparatus therefor".

The above information disclosed in this Background section is only for enhancement of understanding of the background of the invention and, therefore, it may contain information that does not constitute prior art.

SUMMARY

Exemplary embodiments of the present invention a system and method for displaying vehicle driving information, which can allow a driver to intuitively recognize a distance between an ego vehicle and a side-rear vehicle.

Embodiments provide a system configured to display vehicle driving information including a first image acquisition device and a second image acquisition device configured to capture an image of a first side on which a driver seat is located and an image of a second side which is the opposite side of the first side, respectively; a first display device and a second display device connected to the first and second image acquisition devices, respectively, and configured to display the captured images of the first and second image acquisition devices, respectively; a first BSD (Blind Spot Detection) device and a second BSD device installed on the left and right rears of an ego vehicle, respectively, and configured to sense side-rear vehicle information; and a control device configured to recognize the location and vehicle distance of the side-rear vehicle by analyzing the side-rear vehicle information detected by the first and second BSD devices, determine whether to issue a BSD warning based on the recognized location and vehicle distance of the side-rear vehicle, and control BSD warning icons of the ego vehicle and the side-rear vehicle to be displayed as an OSD (On Screen Display) of the images displayed on the first and second display devices.

Each of the first and second BSD devices may be at least one of a radar and a lidar.

The control device may determine that a BSD warning is warranted, when the recognized side-rear vehicle is located on an adjacent lane and the vehicle distance is less than a preset BSD warning reference distance.

The BSD warning icons of the ego vehicle and the side-rear vehicle may be expressed as an ego vehicle indicator icon and a side-rear vehicle indicator icon. The control device may convert the distance between the ego vehicle indicator icon and the side-rear vehicle indicator icon based on the vehicle distance, determine the locations of the ego vehicle indicator icon and the side-rear vehicle indicator icon according to the converted distance, and displays the ego vehicle indicator icon and the side-rear vehicle indicator icon as an OSD at the determined locations.

The control device may convert the vehicle distance into a distance between the ego vehicle indicator icon and the side-rear vehicle indicator icon, using the size ratio of the ego vehicle to the ego vehicle indicator icon.

The control device may change and display the shape or color of the BSD warning icon according to the vehicle distance.

Embodiments also provide a control device including a communication unit configured to receive a captured image or side-rear vehicle information; a side-rear vehicle recognition unit configured to recognize the location and vehicle distance of a side-rear vehicle by analyzing the side-rear vehicle information, and determine whether to issue a BSD warning based on the recognized location and vehicle distance of the side-rear vehicle; and an image processing unit configured to control BSD warning icons of an ego vehicle and the side-rear vehicle to be displayed as an OSD of the captured image, when the BSD warning is warranted.

The side-rear vehicle recognition unit may determine that the BSD warning is warranted, when the recognized side-rear vehicle is located on an adjacent lane and the vehicle distance is less than a preset BSD warning reference distance.

The BSD warning icons of the ego vehicle and the side-rear vehicle may be expressed as the ego vehicle indicator icon and the side-rear vehicle indicator icon. The image processing unit may convert the distance between the ego vehicle indicator icon and the side-rear vehicle indicator icon based on the vehicle distance, determine the locations of the ego vehicle indicator icon and the side-rear vehicle indicator icon according to the converted distance, and display the ego vehicle indicator icon and the side-rear vehicle indicator icon as an OSD at the determined locations.

The image processing unit may converts the vehicle distance into a distance between the ego vehicle indicator icon and the side-rear vehicle indicator icon, using the size ratio of the ego vehicle to the ego vehicle indicator icon.

The image processing unit may change and display the shape or color of the BSD warning icon according to the vehicle distance.

Embodiments also provide a method for displaying vehicle driving information including receiving, by a control device, a captured image or side-rear vehicle information; recognizing, by the control device, the location and vehicle distance of a side-rear vehicle by analyzing the side-rear vehicle information; determining, by the control device, whether to issue a BSD warning based on the recognized location and vehicle distance of the side-rear vehicle; and controlling, by the control device, BSD warning icons of an ego vehicle and the side-rear vehicle to be displayed as an OSD of the captured image, when the BSD warning is warranted.

In the determining of whether to issue the BSD warning, the control device may determine that the BSD warning is warranted, when the recognized side-rear vehicle is located on an adjacent lane and the vehicle distance is less than a preset BSD warning reference distance.

The controlling of the BSD warning icons of the ego vehicle and the side-rear vehicle to be displayed as the OSD of the captured image may include converting the distance between an ego vehicle indicator icon and a side-rear vehicle indicator icon based on the vehicle distance; determining the locations of the ego vehicle indicator icon and the side-rear vehicle indicator icon according to the converted distance; and displaying the ego vehicle indicator icon and the side-rear vehicle indicator icon as an OSD at the determined locations.

In the converting of the distance between the ego vehicle indicator icon and the side-rear vehicle indicator icon, the control device may convert the vehicle distance into a distance between the ego vehicle indicator icon and the side-rear vehicle indicator icon, using the size ratio of the ego vehicle to the ego vehicle indicator icon.

In the displaying of the ego vehicle indicator icon and the side-rear vehicle indicator icon as the OSD at the determined locations, the control device may change and display the shape or color of the BSD warning icon according to the vehicle distance.

In accordance with the embodiment of the inventive concepts, when it is determined that a BSD warning is warranted based on the location and vehicle distance of the side-rear vehicle, the system and method may display the BSD warning icons of the ego vehicle and the side-rear vehicle as an OSD of the driving image, thereby making a driver intuitively recognize the distance between the ego vehicle and the side-rear vehicle.

The system and method may differently display the shapes or colors of the BSD warning icons according to the vehicle distance between the ego vehicle and the side-rear vehicle, thereby not only making a driver intuitively recognize the distance between the ego vehicle and the side-rear vehicle when the vehicle is travels or changes lanes, but also raising the readability of the BSD warning icons.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a system and method for displaying vehicle driving information will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Figure 1:
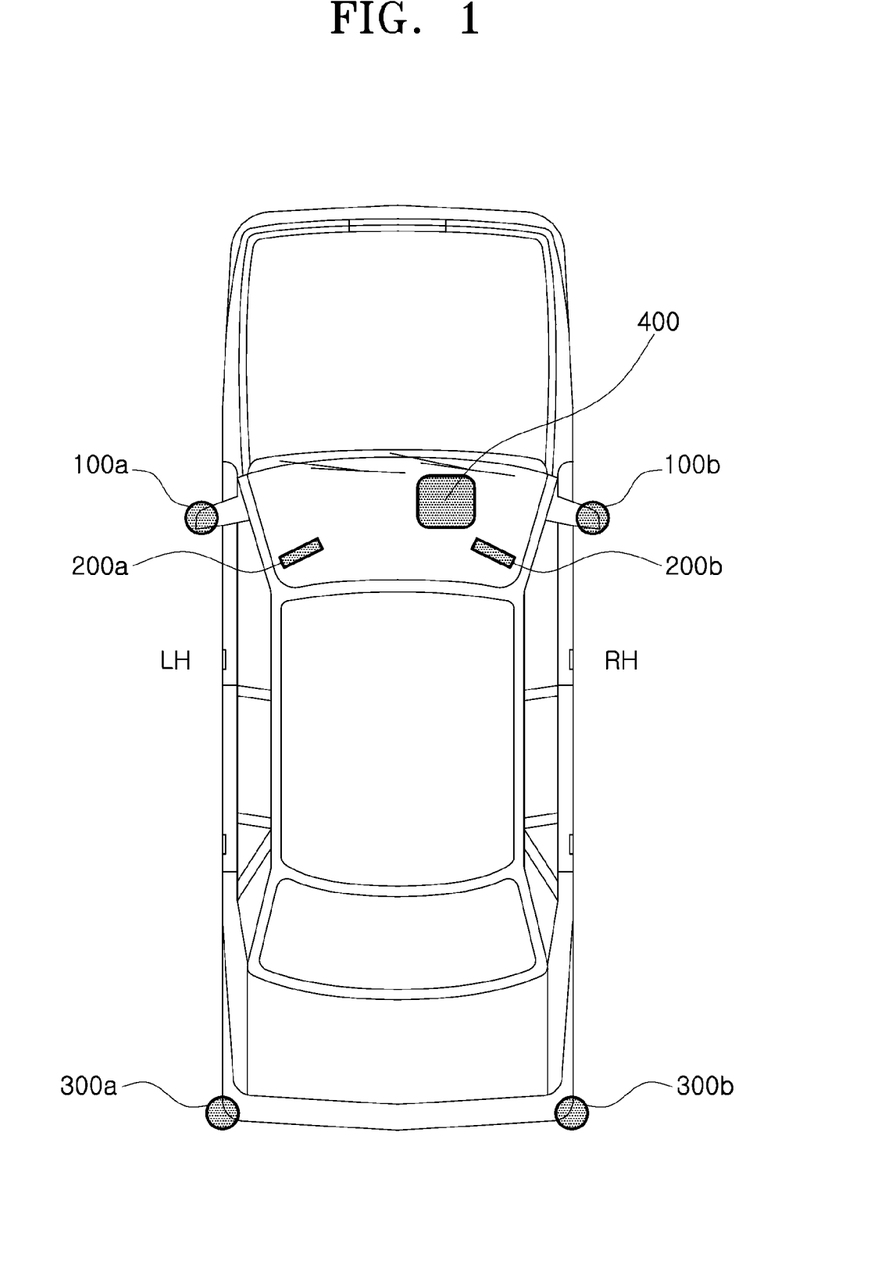
FIG. 1 is a diagram illustrating a vehicle to which a system configured to display vehicle driving information is applied in accordance with an embodiment of the inventive concepts.
Figure 2:
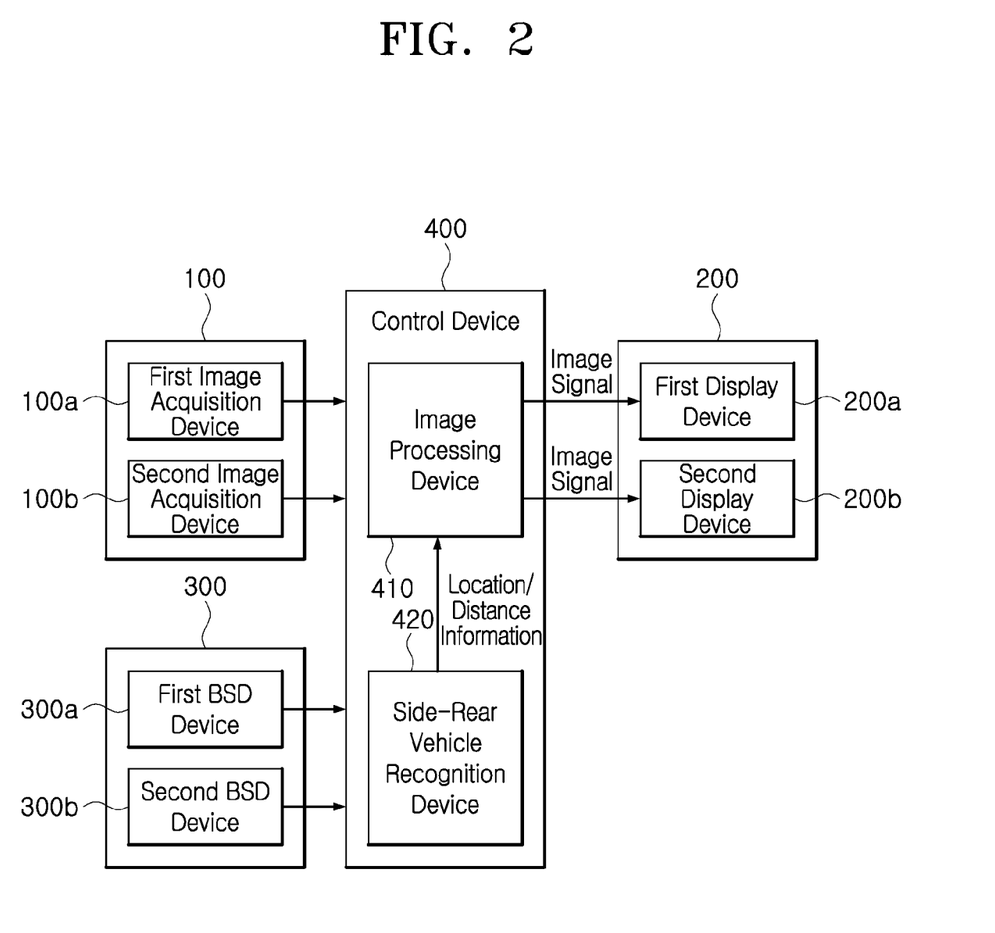
FIG. 2 is a block diagram illustrating the system configured to display vehicle driving information in accordance with the embodiment of the inventive concepts.

FIG. 1 is a diagram illustrating a vehicle in which a system configured to display vehicle driving information is applied in accordance with an embodiment of the inventive concepts, and FIG. 2 is a block diagram illustrating the system configured to display vehicle driving information in accordance with the embodiment of the inventive concepts.

Referring to FIGS. 1 and 2, the system configured to display vehicle driving information in accordance with the embodiment of the inventive concepts may include an image acquisition device 100, a display device 200, a BSD (Blind Spot Detection) device 300 and a control device 400, which are connected through a communication network for a vehicle. The communication network for a vehicle may include various communication networks such as CAN (Controller Area Network), CAN-FD and Ethernet.

The image acquisition device 100 may be mounted instead of side mirrors of an existing vehicle, and components thereof are configured to film rear areas on a first side LH and a second side RH of the vehicle. The first side LH may indicate a driver seat side on which a driver seat is located, and the second side RH may indicate the opposite side of the drive seat side, for example, a passenger seat side on which a passenger seat is located. The first side LH may become the left side when the driver seat is located on the left side, and become the right side when the driver seat is located on the right side. In the present embodiment, the first side LH becomes the left side, and the second side RH becomes the right side.

For this configuration, the image acquisition device 100 may include a first image acquisition device 100a configured to capture an image of the rear area of the vehicle on the first side LH and a second image acquisition device 100b configured to capture an image of the rear area of the vehicle on the second side RH. The above-described image acquisition device 100 may be a camera, for example, and include a communication unit (not illustrated).

The BSD device 300 is installed at the left and right rear of the vehicle, and is configured to detect side-rear vehicle information of vehicles near the side-rear of the ego vehicle. The side-rear vehicle information may include the location, direction and distance of a side-rear vehicle. A side-rear vehicle may refer to a vehicle that is approaching or has approached the ego vehicle from the side or the rear or a combination of both. Also a side-rear vehicle may be a vehicle that the ego vehicle has passed and may then be detectable by the BSD device 300.

The BSD device 300 may include a first BSD device 300a configured to sense first-side-rear vehicle information of the vehicle and a second BSD device 300b configured to sense second-side-rear vehicle information of the vehicle. The embodiment of the inventive concepts describes that two BSD devices 300 may be disposed at the side-rears of the vehicle. However, the inventive concepts are not limited thereto. The number of the BSD devices 300 disposed on the vehicle may be changed according to the size of the vehicle.

Each of the first and second BSD devices 300a and 300b may be implemented by a radar, a lidar and the like, for example.

The display device 200 may be connected to the image acquisition device 100 and display an image captured by the image acquisition device 100. The display device 200 may include a first display device 200a connected to the first image acquisition device 100a and a second display device 200b connected to the second image acquisition device 100b. Therefore, the first display device 200a may display an image transmitted from the first image acquisition device 100a, and the second display device 200b may display an image transmitted from the second image acquisition device 100b.

The control device 400 is configured to recognize the location of a side-rear vehicle and the distance from the side-rear vehicle by analyzing the side-rear vehicle information detected by the first and second BSD devices 300a and 300b, and determines whether to issue a BSD warning based on the recognized location of the side-rear vehicle and the recognized distance from the side-rear vehicle. When the BSD warning is warranted, the control device 400 controls BSD warning icons of the ego vehicle and the side-rear vehicle to be displayed as an OSD (On-Screen Display) of the images displayed on the first and second display devices 200a and 200b. The vehicle distance may indicate a distance between the ego vehicle and a side-rear vehicle, and the BSD warning icons of the ego vehicle and the side-rear vehicle may be expressed as an ego vehicle indicator icon and a side-rear vehicle indicator icon.

The control device 400 includes an image processing unit 410 and a side-rear vehicle recognition unit 420. The control device 400 may further include a communication unit (not illustrated) configured to communicate with the image acquisition device 100, the display device 200 and the BSD device 300.

When receiving the side-rear vehicle information from the first or second BSD device 300a or 300b, the side-rear vehicle recognition unit 420 analyzes the side-rear vehicle information, and determines whether the side-rear vehicle is located on a lane adjacent to the ego vehicle. At this time, the side-rear vehicle recognition unit 420 may determine whether the side-rear vehicle is located in the adjacent lane, using distance, direction and the like which are included in the side-rear vehicle information. Furthermore, the side-rear vehicle recognition unit 420 may determine whether the side-rear vehicle is located in the adjacent lane using the captured images from the first and second image acquisition devices 100a and 100b and the distance and direction of the side-rear vehicle information.

When determining that the side-rear vehicle is located in the adjacent lane, the side-rear vehicle recognition unit 420 compares the vehicle distance of the side-rear vehicle information to a preset BSD warning reference distance, and determines whether a BSD warning is warranted. That is, when the vehicle distance between the ego vehicle and the side-rear vehicle is less than the BSD warning reference distance, the side-rear vehicle recognition unit 420 determines that the BSD warning is warranted, and transmits a BSD warning request signal to the image processing unit 410. The BSD warning request signal may include the location and vehicle distance of the side-rear vehicle.

When receiving the BSD warning request signal from the side-rear vehicle recognition unit 420, the image processing unit 410 displays the BSD warning icons of the ego vehicle and the side-rear vehicle as an OSD of the captured images from the first and second image acquisition devices 110a and 110b, and transmits the BSD warning icons to the first and second display devices 200a and 200b. At this time, the BSD warning icons of the ego vehicle and the side-rear vehicle may be expressed as the ego vehicle indicator icon and the side-rear vehicle indicator icon.

Therefore, the image processing unit 410 converts the distance between the ego vehicle indicator icon and the side-rear vehicle indicator icon based on the vehicle distance between the ego vehicle and the side-rear vehicle. For example, when the size of the ego vehicle indicator icon is 1/n of the actual ego vehicle, the image processing unit 410 may calculate the distance between the ego vehicle indicator icon and the side-rear vehicle indicator icon as 1/n of the actual side-rear vehicle distance.

The image processing unit 410 determines the locations of the ego vehicle indicator icon and the side-rear vehicle indicator icon according to the converted distance. At this time, the image processing unit 410 may fix the location of the ego vehicle indicator icon, and determine a location corresponding to the converted distance from the ego vehicle indicator icon as the location of the side-rear vehicle indicator icon.

The image processing unit 410 displays, on the determined locations, the ego vehicle indicator icon and the side-rear vehicle indicator icon as an OSD of the captured images transmitted from the first and second image acquisition devices 100a and 100b, and transmits the ego vehicle indicator icon and the side-rear vehicle indicator icon to the first and second display devices 200a and 200b at the determined locations. At this time, the image processing unit 410 may dispose the ego vehicle indicator icon and the side-rear vehicle indicator icon at the top, bottom and sides of the display device screen, in order to minimize a part of the screen of the display device 200, covered by the icons. The image processing unit 410 may change and display the shape or color of the BSD warning icon according to the vehicle distance.

The BSD warning icon shows to a driver a relative distance of a side-rear vehicle. In order to warn the driver of a side-rear vehicle approaching the ego vehicle, the image processing unit 410 may variously display a shape or color of the BSD warning icon according to a vehicle distance. Through this operation of becoming accustomed to different variations of the BSD warning icon, the driver may intuitively sense a risk when the side-rear vehicle approaches the ego vehicle.

The control device 400 may be an ECU (Electronic Control Unit), for example.

The first and second display devices 200a and 200b may display BSD warning icons as an OSD on a driving image transmitted from the image acquisition device 100.

Embodiments described herein present that the control device 400 is configured to analyze the side-rear vehicle information detected by the first and second BSD devices 300a and 300b and recognize the location and vehicle distance of the side-rear vehicle. The control device 400 may also recognize the location and vehicle distance of the side-rear vehicle using the captured images acquired by the first and second image acquisition devices 100a and 100b, or in combination with the BSD devices 300a and 300b. That is, the control device 400 may not only recognize the location and vehicle distance of the side-rear vehicle using the image of the side-rear vehicle when the first or second BSD device 300a or 300b is provided, but also recognize the location and vehicle distance of the side-rear vehicle even when the first and second image acquisition devices 100a and 100b are provided. Therefore, because the control device 400 can recognize the location and vehicle distance of the side-rear vehicle when the side-rear vehicle information or the side-rear vehicle image information is provided, the location and vehicle distance of the side-rear vehicle can be recognized through various methods.

Figure 3:
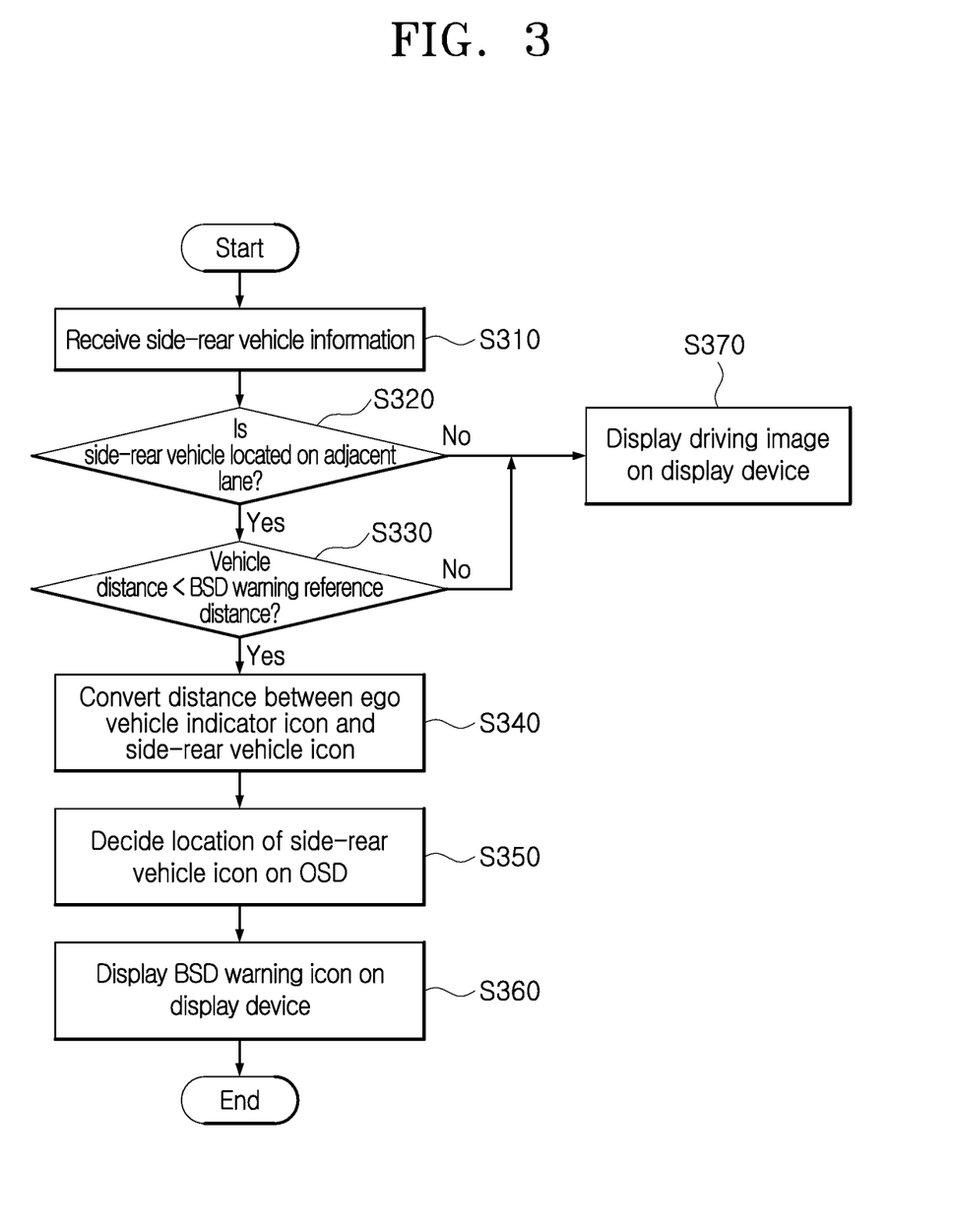
FIG. 3 is a flowchart illustrating a method for displaying vehicle driving information in accordance with an embodiment of the inventive concepts.
Figure 4A:
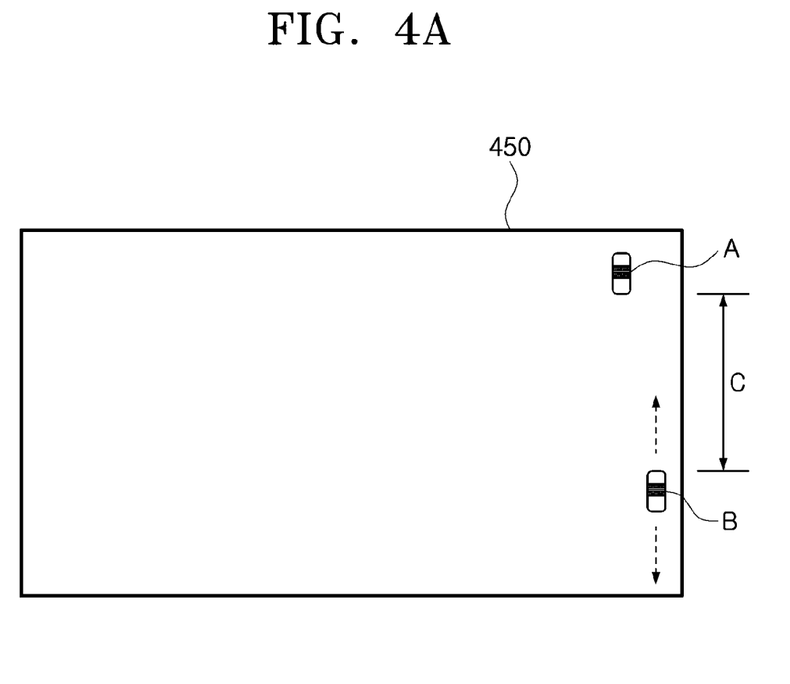
FIGS. 4A and 4B are diagrams illustrating a method to express a BSD warning icon as OSD in accordance with the embodiment of the inventive concepts.
Figure 4B:
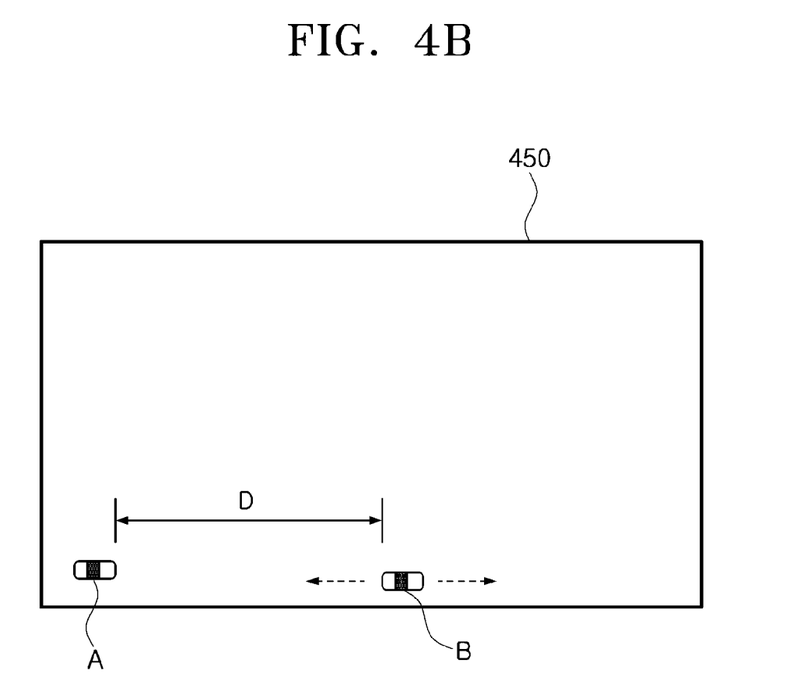

FIG. 3 is a flowchart illustrating a method for displaying vehicle driving information in accordance with an embodiment of the inventive concepts, FIGS. 4A and 4B are diagrams illustrating a method of expressing a BSD warning icon as OSD in accordance with the embodiment of the inventive concepts, and FIGS. 5A, 5B, 5C, and 5D are diagrams illustrating a method for displaying a BSD warning on the display device in accordance with an embodiment of the inventive concepts.

Referring to FIG. 3, a method for displaying vehicle driving information may start with receiving side-rear vehicle information in operation S310. When receiving a captured image or side-rear vehicle information in operation S310, the control device 400 analyzes the side-rear vehicle information, and determines whether the side-rear vehicle is located in an adjacent lane in operation S320. At this time, the control device 400 may determine whether the side-rear vehicle is located in the adjacent lane. Determination of a location of the side-rear vehicle may be made using the distance of the side-rear vehicle, direction heading of the side-rear vehicle, and the like which are included in the side-rear vehicle information. Determination by the control device 400 and the image processing device 410 of the location of the side-rear vehicle may be repetitively updated as the location of the side-rear vehicle relative to the ego vehicle changes. When a change in distance between the ego vehicle and side-rear vehicle is detected, the distance between the ego vehicle icon and side-rear vehicle icon may be correspondingly changed.

When the determination result of operation S320 indicates that the side-rear vehicle is located in the adjacent lane, the control device 400 determines whether the vehicle distance is less than the preset BSD warning reference distance, in operation S330.

When the determination result of operation S330 indicates that the vehicle distance is less than the preset BSD warning reference distance, the control device 400 converts and determines a distance between the ego vehicle indicator icon and the side-rear vehicle indicator icon based on the vehicle distance between the two vehicles in operation S340, and determines in relation the two vehicle distances the locations of the ego vehicle indicator icon and the side-rear vehicle indicator icon on the OSD according to the converted distance in operation S350.

The BSD warning icon may be expressed using at least two different icons including the ego vehicle indicator icon and the side-rear vehicle indicator icon. The control device 400 may dispose the ego vehicle indicator icon and the side-rear vehicle indicator icon at the top, bottom and sides of the display device screen, in order to minimize a part of the screen of the display device 200, covered by the icons. In one relational state, the location of the ego vehicle indicator icon may be fixed, and the location of the side-rear vehicle indicator icon may be moved to various locations in relation to the position of the ego vehicle indicator icon.

For example, as illustrated in FIG. 4A, the control device 400 may display on the right side of a screen 450 on a car window an ego vehicle indicator icon A and a side-rear vehicle indicator icon B at a distance C between the two icons corresponding to the converted distance of the ego vehicle and side-rear vehicle. Similarly, the icons A and B separated by a distance C may be displayed on a left side of the screen 450.

As illustrated in FIG. 4B, the control device 400 may display on the bottom side of the screen 450 the ego vehicle indicator icon A and the side-rear vehicle indicator icon B at a longer distance D between the two icons corresponding to the converted distance between the ego vehicle and the side-rear vehicle. As illustrated in FIG. 4B, when a distance between the ego vehicle and the side-rear vehicle is greater, the longer converted distance may be displayed on a bottom part of the screen 450 because the bottom part has a longer length. Similarly the longer length D may be displayed on a top portion of the screen 450. Through this operation, the driver may intuitively recognize the distance between the ego vehicle and the side-rear vehicle.

When operation S350 is performed, the control device 400 controls the ego vehicle indicator icon and the side-rear vehicle indicator icon to be displayed at the determined locations as an OSD, in operation S360. That is, the images A and B may be referred to as OSD. At this time, the control device 400 may change and display the shape or color of the BSD warning icon according to the vehicle distance. For example, the control device 400 may change and display the color of the OSD according to the vehicle distance (for example, a long distance, middle distance or short distance). The control device 400 may dispose an additional OSD at the bottom of the warning icon in order to raise the readability of the BSD warning OSD.

Figure 5A:
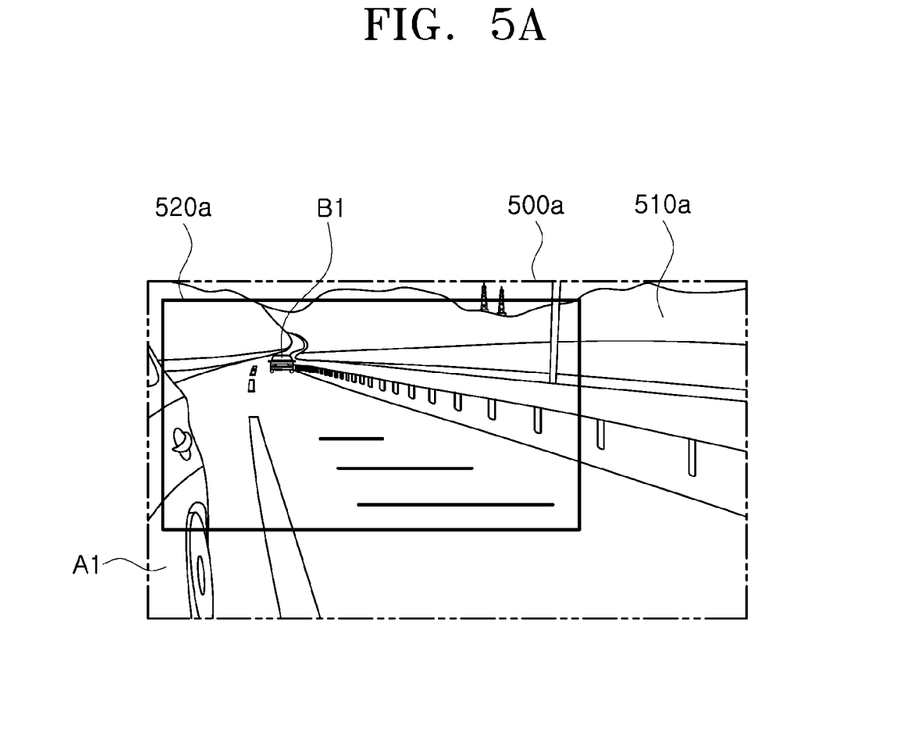
FIGS. 5A, 5B, 5C, and 5D are diagrams illustrating a method for displaying a BSD warning on a display device in accordance with an embodiment of the inventive concepts.

For example, as illustrated in FIG. 5A when the vehicle distance between the ego vehicle A1 and the side-rear vehicle B1 is equal to or more than the BSD warning reference distance, the control device 400 may not display the BSD warning icon on the car window of the ego vehicle A1. At this time, on a screen 500a of the display device 200, a distance indicator line OSD 520a, which is configured by displaying a distance indicator line as an OSD, may be displayed on a driving image 510a on which the image transmitted from the image acquisition device 100 is displayed.

Figure 5B:
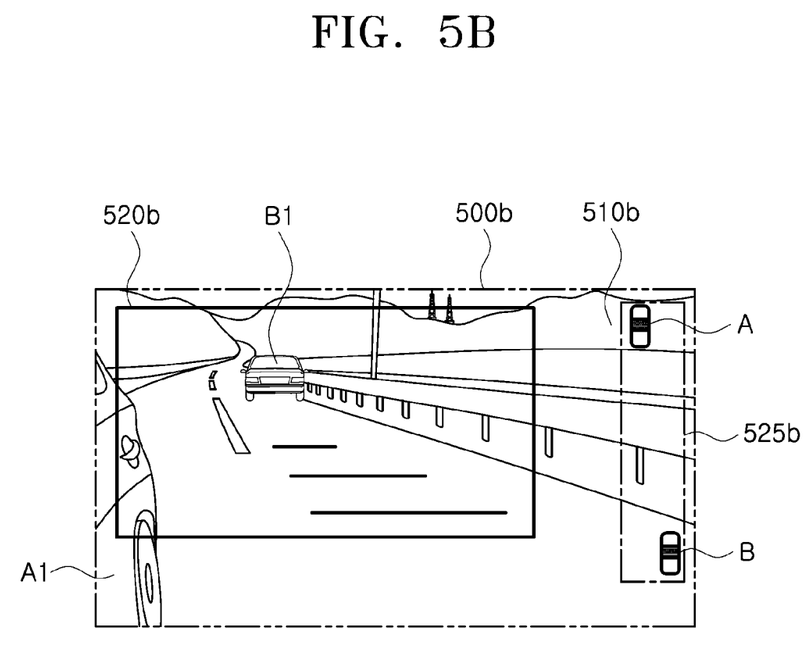

When the vehicle distance between the ego vehicle A1 and the side-rear vehicle B1 is a long distance within the BSD warning reference distance as illustrated in FIG. 5B, the control device 400 may display the BSD warning icons A and B in green on the right side of the screen 500b, for example. At this time, on the screen 500b of the display device 200, a distance indicator line OSD 520b, which is displayed as an OSD, and a BSD warning OSD 525b in which the ego vehicle indicator icon A and the side-rear vehicle indicator icon B are displayed as an OSD may be displayed on a driving image 510b on which the image transmitted from the image acquisition device 100 is displayed. The distance indicator line OSD 520b and the BSD warning OSD 525b may be displayed in green.

Figure 5C:
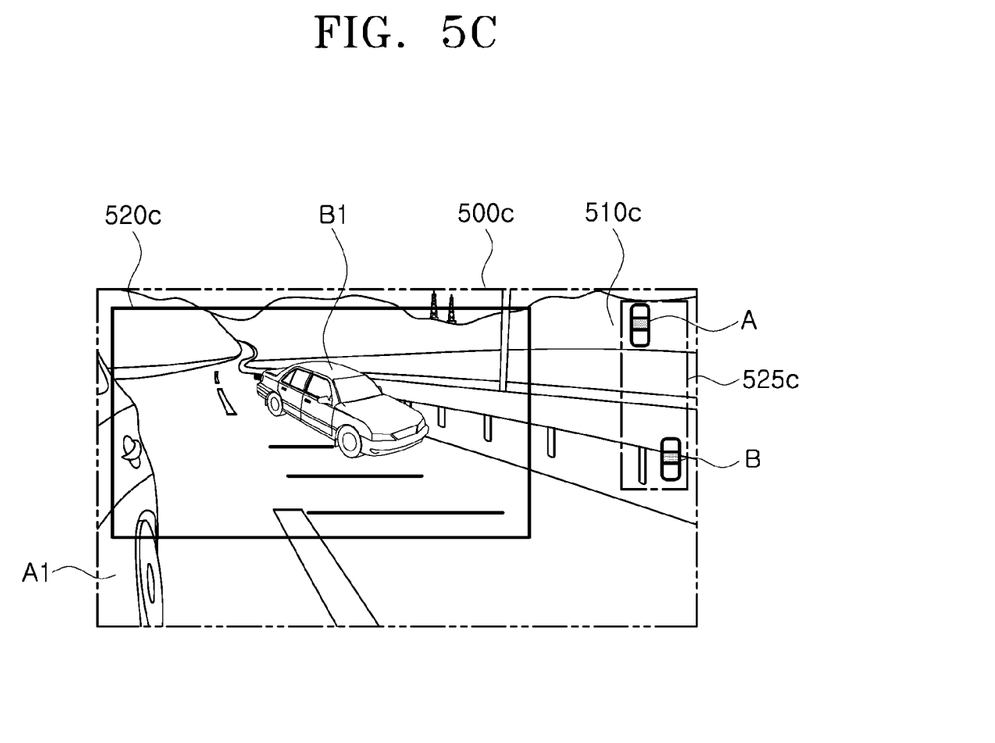

When the vehicle distance between the ego vehicle A1 and the side-rear vehicle B1 is a middle distance within the BSD warning reference distance as illustrated in FIG. 5C, the control device 400 may display the BSD warning icons A and B in yellow. At this time, on a screen 500c of the display device 200, a distance indicator line OSD 520c, which is displayed as an OSD, and a BSD warning OSD 525c in which the ego vehicle indicator icon A and the side-rear vehicle indicator icon B are displayed as an OSD may be displayed on a driving image 510c on which the image transmitted from the image acquisition device 100 is displayed. The distance indicator line OSD 520c and the BSD warning OSD 525c may be displayed in yellow.

Figure 5D:
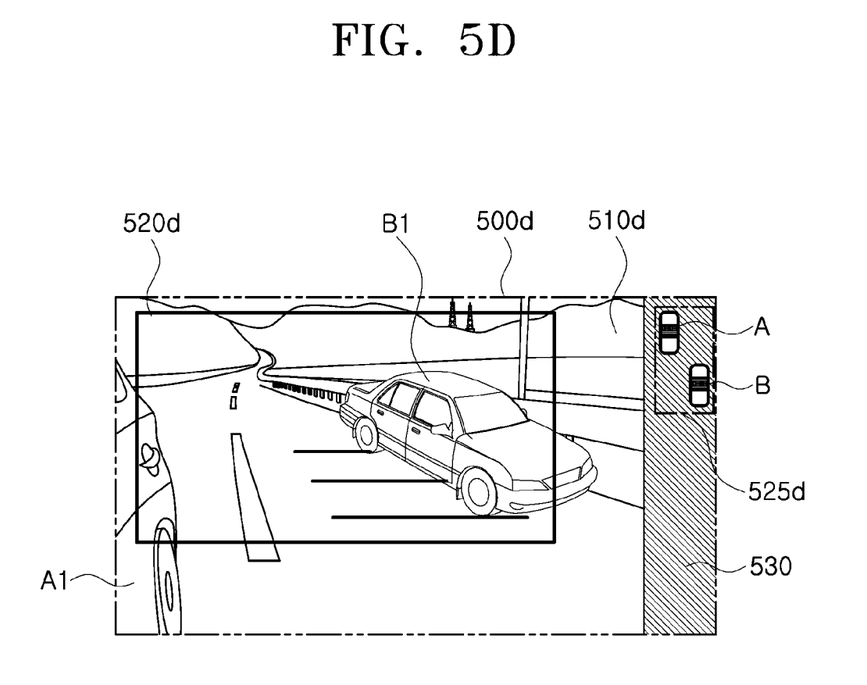

When the vehicle distance between the ego vehicle A1 and the side-rear vehicle B1 is a short distance within the BSD warning reference distance as illustrated in FIG. 5D, the control device 400 may display the BSD warning icons A and B in red. At this time, on a screen 500d of the display device 200, a distance indicator line OSD 520d, which is displayed as an OSD, and a BSD warning OSD 525d in which the ego vehicle indicator icon A and the side-rear vehicle indicator icon B are displayed as an OSD may be displayed on a driving image 510d on which the image transmitted from the image acquisition device 100 is displayed. The distance indicator line OSD 520*d* and the BSD warning OSD 525*d* may be displayed in red. Furthermore, a black OSD 530 may be added to the BSD warning OSD 525*d* on the side of the screen of the display device 200, in order to raise the readability of the icons.

When the determination result of operation S320 indicates that the side-rear vehicle is not located in the adjacent lane, the control device 400 displays the driving image, transmitted from the image acquisition device 100, on the display device 200 in operation S370.

In accordance with the embodiment of the inventive concepts, when it is determined that a BSD warning is warranted based on the location and vehicle distance of the side-rear vehicle, the system and method may display the BSD warning icons of the ego vehicle and the side-rear vehicle as an OSD of the driving image, thereby allowing a driver to intuitively recognize the distance between the ego vehicle and the side-rear vehicle. At this time, the system and method may differently display the shapes or colors of the BSD warning icons according to the vehicle distance between the ego vehicle and the side-rear vehicle, thereby not only allowing a driver to intuitively recognize the distance between the ego vehicle and the side-rear vehicle when either of the vehicles is traversing or changing lanes, but also raising the readability of the BSD warning icons.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A system for displaying vehicle driving information, comprising:
   a first image acquisition device and a second image acquisition device configured to capture an image of a first side of an ego vehicle on which a driver seat is located and an image of a second side of the ego vehicle which is the opposite side of the first side, respectively;
   a first display device and a second display device connected to the first and second image acquisition devices, respectively, and configured to display the captured images of the first and second image acquisition devices, respectively;
   a first BSD (Blind Spot Detection) device and a second BSD device installed on left and right rears of the ego vehicle, respectively, and configured to sense side-rear vehicle information; and
   a control device configured to recognize the location and vehicle distance of the side-rear vehicle by analyzing the side-rear vehicle information detected by the first and second BSD devices, determine whether to issue a BSD warning based on the recognized location and vehicle distance of the side-rear vehicle, and control BSD warning icons of the ego vehicle and the side-rear vehicle to be displayed as an OSD (On Screen Display) of the images displayed on the first and second display devices,
   wherein:
   the BSD warning icons of the ego vehicle and the side-rear vehicle are expressed as an ego vehicle indicator icon and a side-rear vehicle indicator icon;
   the control device converts the distance between the ego vehicle indicator icon and the side-rear vehicle indicator icon based on the vehicle distance between the ego vehicle and the side-rear vehicle, determines the locations of the ego vehicle indicator icon and the side-rear vehicle indicator icon according to the converted distance, and displays the ego vehicle indicator icon and the side-rear vehicle indicator icon as an OSD at the determined locations separated by the converted distance; and
   the control device converts the vehicle distance into a distance between the ego vehicle indicator icon and the side-rear vehicle indicator icon, using the size ratio of the ego vehicle to the ego vehicle indicator icon.

2. The system of claim 1, wherein each of the first and second BSD devices is at least one of a radar and a lidar.

3. The system of claim 1, wherein the control device determines that a BSD warning is warranted when the recognized side-rear vehicle is located in an adjacent lane and the vehicle distance is less than a preset BSD warning reference distance.

4. The system of claim 1, wherein the control device changes and displays the shape or color of the BSD warning icon according to the vehicle distance.

5. The system of claim 1, wherein the OSD display images of the ego vehicle indicator icon and the side-rear vehicle indicator icon change distances as the ego vehicle and side-rear vehicle distances change.

6. The system of claim 1, wherein colors of the OSD display images change from one color to another as the distance between the ego vehicle and side-rear vehicle changes distances.

7. A control device comprising:
   a processor;
   wherein the processor performs operations as:
   a communication unit configured to receive a captured image or side-rear vehicle information;
   a side-rear vehicle recognition unit configured to recognize a location and vehicle distance of a side-rear vehicle in relation to an ego vehicle by analyzing the side-rear vehicle information, and determine whether to issue a BSD warning based on the recognized location and vehicle distance of the side-rear vehicle; and
   an image processing unit configured to control BSD warning icons of the ego vehicle and the side-rear vehicle to be displayed as an OSD of the captured image, when the BSD warning is warranted,
   wherein:
   the BSD warning icons of the ego vehicle and the side-rear vehicle are expressed as the ego vehicle indicator icon and the side-rear vehicle indicator icon;
   the image processing unit converts the distance between the ego vehicle indicator icon and the side-rear vehicle indicator icon based on the vehicle distance between the ego vehicle and the side-rear vehicle, determines the locations of the ego vehicle indicator icon and the side-rear vehicle indicator icon according to the converted distance, and displays the ego vehicle indicator icon and the side-rear vehicle indicator icon as an OSD at the determined locations on a screen; and
   the image processing unit converts the vehicle distance into a distance between the ego vehicle indicator icon and the side-rear vehicle indicator icon, using a size ratio of the ego vehicle to the ego vehicle indicator icon.

8. The control device of claim 7, wherein the side-rear vehicle recognition unit determines that the BSD warning is warranted, when the recognized side-rear vehicle is located in an adjacent lane and the vehicle distance between the ego vehicle and the side-rear vehicle is less than a preset BSD warning reference distance.

9. The control device of claim 7, wherein the image processing unit changes and displays the shape or color of the BSD warning icon according to the vehicle distance.

10. The control device of claim 7, wherein the image processing unit displays OSD display images of the ego vehicle indicator icon and the side-rear vehicle indicator icon as the ego vehicle and side-rear vehicle distances change.

11. A method for displaying vehicle driving information, comprising:
receiving, by a control device, a captured image or side-rear vehicle information;
recognizing, by the control device, the location and vehicle distance of a side-rear vehicle by analyzing the side-rear vehicle information;
determining, by the control device, whether to issue a BSD warning based on the recognized location and vehicle distance of the side-rear vehicle; and
controlling, by the control device, BSD warning icons of an ego vehicle and the side-rear vehicle to be displayed as an OSD of the captured image, when the BSD warning is warranted,
wherein:
the controlling of the BSD warning icons of the ego vehicle and the side-rear vehicle to be displayed as the OSD of the captured image comprises:
converting the distance between an ego vehicle indicator icon and a side-rear vehicle indicator icon based on the vehicle distance between the ego vehicle and the side-rear vehicle;
determining the locations of the ego vehicle indicator icon and the side-rear vehicle indicator icon according to the converted distance; and
displaying the ego vehicle indicator icon and the side-rear vehicle indicator icon as an OSD at the determined locations; and
in the converting of the distance between the ego vehicle indicator icon and the side-rear vehicle indicator icon, the control device converts the vehicle distance between the ego vehicle and the side-rear vehicle into a distance between the ego vehicle indicator icon and the side-rear vehicle indicator icon, using a size ratio of the ego vehicle to the ego vehicle indicator icon.

12. The method of claim 11, wherein in the determining of whether to issue the BSD warning, the control device determines that the BSD warning is warranted, when the recognized side-rear vehicle is located in an adjacent lane and the vehicle distance is less than a preset BSD warning reference distance.

13. The method of claim 11, wherein in the displaying of the ego vehicle indicator icon and the side-rear vehicle indicator icon as the OSD at the determined locations, the control device changes and displays the shape or color of the BSD warning icon according to the vehicle distance.

14. The method of claim 11, comprising:
changing distances of the OSD display images of the ego vehicle indicator icon and the side-rear vehicle indicator icon when the distances of the ego vehicle and side-rear vehicle distances change.

* * * * *